United States Patent
Hong et al.

(10) Patent No.: US 9,489,260 B1
(45) Date of Patent: Nov. 8, 2016

(54) FLEXIBLE SUPER BLOCK SIZING FOR FAILED SECTOR RECOVERY

(71) Applicant: Seagate Technology LLC, Cupertino, CA (US)

(72) Inventors: Eun Yeong Hong, Suwon (KR); Bum Seok Park, Suwon (KR); Moweon Lee, Suwon (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/721,227

(22) Filed: May 26, 2015

(51) Int. Cl.
| | |
|---|---|
| *G11B 20/18* | (2006.01) |
| *G06F 11/10* | (2006.01) |
| *G06F 3/06* | (2006.01) |
| *G11B 5/09* | (2006.01) |
| *G11B 20/12* | (2006.01) |
| *G11B 5/012* | (2006.01) |

(52) U.S. Cl.
CPC .......... *G06F 11/1076* (2013.01); *G06F 3/064* (2013.01); *G06F 3/0619* (2013.01); *G06F 3/0673* (2013.01); *G06F 11/10* (2013.01); *G06F 11/1004* (2013.01); *G11B 5/09* (2013.01); *G11B 20/18* (2013.01); *G11B 20/1833* (2013.01); *G11B 5/012* (2013.01); *G11B 2020/1222* (2013.01); *G11B 2020/1224* (2013.01); *G11B 2020/1232* (2013.01); *G11B 2020/1298* (2013.01)

(58) Field of Classification Search
None
See application file for complete search history.

(56) References Cited

U.S. PATENT DOCUMENTS

| | | |
|---|---|---|
| 6,446,156 B1 | 9/2002 | Chia et al. |
| 7,827,378 B2 | 11/2010 | Feldman et al. |
| 8,122,322 B2 | 2/2012 | Miller |
| 8,756,399 B2 | 6/2014 | Feldman |
| 2014/0055881 A1 | 2/2014 | Zaharris |

*Primary Examiner* — Brian Butcher
(74) *Attorney, Agent, or Firm* — HolzerIPLaw, PC

(57) ABSTRACT

The disclosed technology provides for a method or system comprising determining size of a super block for a track zone in a storage medium based on at least one parameter of the track zone, wherein the super block includes a super parity for recovery of a failed sector within the super block.

20 Claims, 4 Drawing Sheets

FLEXIBLE SUPER BLOCK SIZING FOR FAILED SECTOR RECOVERY

SUMMARY

The disclosed technology provides for a method and system comprising determining size of a super block for a track zone in a storage medium based on at least one parameter of the track zone, wherein the super block includes a super parity for recovery of a failed sector within the super block.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

These and various other features and advantages will be apparent from a reading of the following detailed description.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components.

DETAILED DESCRIPTIONS

Figure 1:
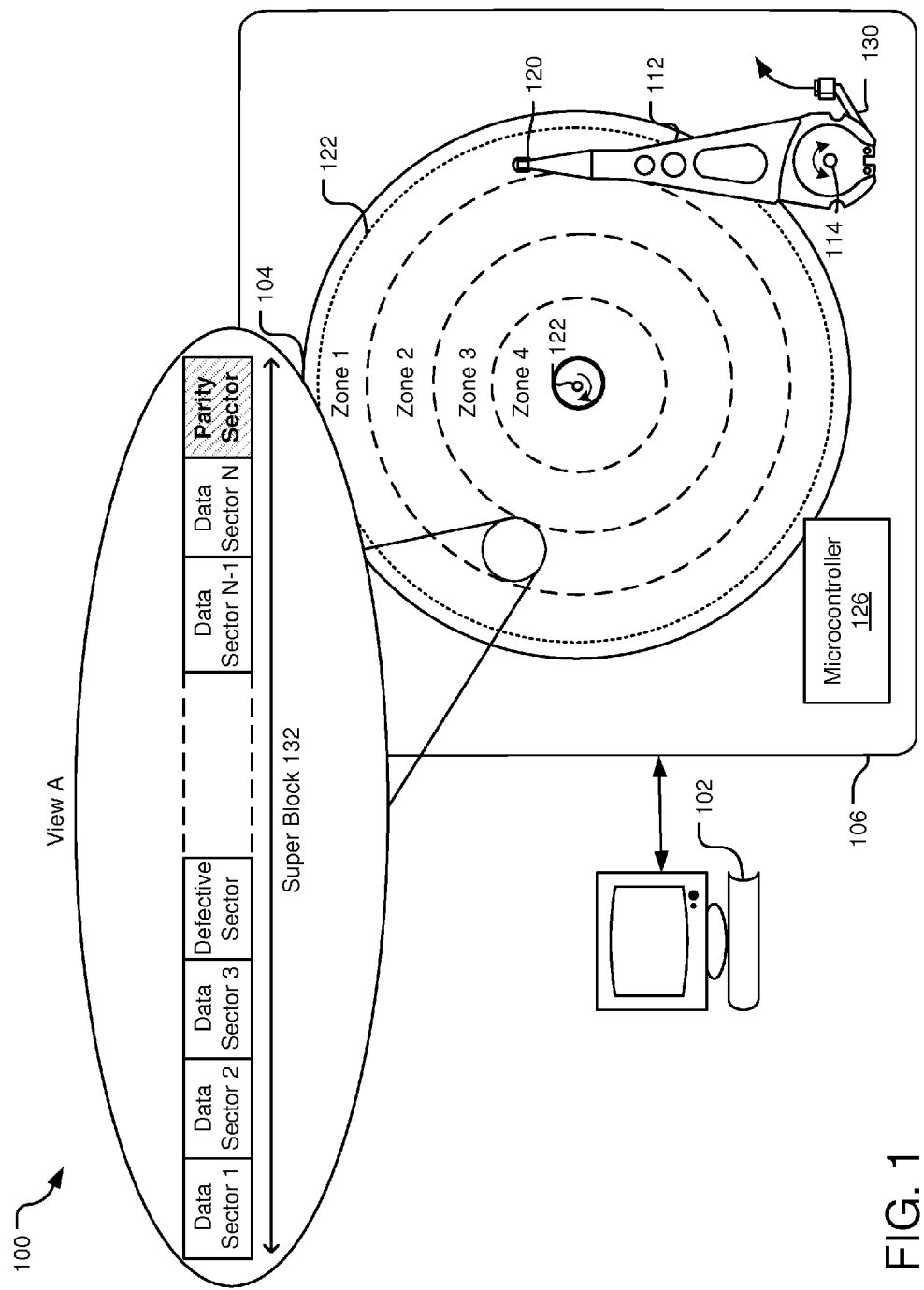
FIG. 1 illustrates a schematic diagram of an example data storage system utilizing the flexible super block sizing scheme.

Errors may be induced in data stored on certain types of data storage devices, such as hard disc drives. For example, physical impact or interaction with electrical or magnetic fields may induce such errors. To help improve data reliability, a storage device may store error detection data (EDI)), such as parity bits. In some configurations, a portion of data may be stored at a hard disc and EDD related to that portion of the data may be stored on the hard disc adjacent to the portion of data. To provide additional data reliability certain storage devices may also store error correction data (ECD), such as super parity data. The ECD may be used to assist with reconstructing data in which errors have been induced. For example, an error correction algorithm may use the ECD to reconstruct data without such error.

A storage device may logically divide the storage space into a plurality of sectors, each sector comprising a predetermined number of bytes of data. For storage media such as a disc drive, the data is stored on a plurality of concentric tracks. The storage device may also logically divide the entire storage space on the storage device into a plurality of track zones, each track zone defied by contiguous tracks within a radial zone. Furthermore, a plurality of contiguous sectors within a track zone may be logically grouped together to form a block, referred to herein as a "super block." The data within such super blocks are stored with a super parity for error correction to the data within the super block. Specifically, the super parity is calculated based on the data stored within the super block and using a parity calculation algorithm.

The disclosed technology provides for a method of determining the size of a super block (e.g., a plurality of contiguous sectors) for a track zone in a storage medium based on at least one parameter of the track zone. The super block includes at least one super parity for recovery of a failed sector within the super block. The parameters used to determine the size of the super block can include, but are not limited to, bit error rate, the sectors per track zone, the types of data, etc. For example, the size of a super block for a particular zone may be small if the data to be stored in that particular zone is requires high fidelity (such as system data, cache data, etc.). On the other hand, if the data to be stored in another zone does not require high fidelity (i.e., video data), the size of super block in that data sector may be small. As disclosed below, determining the size of the super block in this manner allows removing cross-track issues where a super block is located over multiple tracks. Furthermore, the size of the super block is also determined in such a manner so that the number of read sectors required to use super parity is reduced. The reduction in the number sectors required for use of super parity allows using the super parity without a decrease in performance and to have a flexible scheme by dynamically prioritizing capacity or reliability during processing. Additionally, a parity sector ratio of each track zone by error rate can be controlled (i.e., how many super parity sectors used). Up to four parity sectors per super block can be used, for example, if there are 100 sectors per track, one parity sector, then the parity sector ratio will be 1%, or if there are two parity sectors, the parity sector ratio will be 2%. The number of parity sectors can be controlled.

FIG. 1 illustrates a schematic diagram 100 of an example data storage system utilizing the flexible super block sizing scheme disclosed herein. The data storage system includes a host computer 102 that sends one or more access commands (e.g., read or write commands) to a storage device 106. The storage device 106 is a disk drive assembly; however, in other implementations, the storage device 106 may be any device having any tangible computer-readable storage media. Such tangible computer-readable media may include without limitation magnetic storage disks, solid state drives, flash memory, optical storage disks, random access memories (RAMs), read only memories (ROMs) and the like. The storage device 106 includes a disk 104 that may store data on one or both of its planar surfaces (only one planar surface is shown). Further, each planar surface capable of storing data includes a series of thin concentric tracks (e.g., a data track 122).

A head assembly (e.g., a head 120) is positioned adjacent to each planar surface capable of storing and retrieving data. Each head assembly reads and writes data to and from the corresponding planar surface. The head 120 is attached to a distal end of an actuator arm 112 positioned over the disk 104. A rotary voice coil motor that rotates about an actuator axis of rotation 114 is used to position the head 120 on a data track (e.g., the data track 122) and a spindle motor that rotates about disk axis of rotation 122 is used to rotate the disk 104. A flex cable 130 provides the requisite electrical connection paths for the head 120 while allowing pivotal movement of the actuator arm 112 during operation. Servo signals are detected and demodulated by one or more demodulator circuits (not shown) and processed by a digital signal processor (not shown) to control the position of the head 120. It should be understood that the described technology may be used with a variety of storage formats, including continuous magnetic media, discrete track media, shingled media, etc.

The storage device 106 includes a microcontroller 126 that includes a plurality of encoders configured to encode data from the host computer 102 before the data is written to the disk 104. The encoders may be hardware, software, and/or firmware executable by an integrated processor of the storage device 106 or a processor of a host computer 102.

To write data to the disk 104, the host computer 102 sends data in a form of a binary data stream (i.e., a series of 1s and 0s) to the storage device 106. The microcontroller 126 receives the binary data stream and selects one or more encoders to encode the data before writing it to the disk 104. The encoders add additional bits (e.g., error-correcting bits) and/or convert the data stream into a form suitable for recording. When data is read back from the disk 104, the additional bits may allow the storage device 106 to detect and correct a limited number of errors that occur in the read data. Examples of such encoders may be an error corrector code (ECC) coder to generate error correction data (ECD).

Such ECC coder may be a sector-based ECC coder, a track-based ECC coder, and more generally, a zone-based ECC coder (e.g., where a zone includes multiple data tracks). A sector-based ECC coder adds coding redundancies to a data stream to enable error correction within a sector of the storage medium on the disc 104. Similarly, a track-based ECC coder adds coding redundancies to a data stream to enable error correction at a track level, whereas a zone-based ECC coder adds coding redundancies to a data stream to enable error correction at a zone level.

When data is read back from a predefined data region (such as a sector, a track, a zone, etc.), ECC coding redundancies stored in the data region are used to ensure that the data is read back correctly. For example, a sector-based ECC code may be used to correct data of an individual data sector by analyzing data read from the sector. Likewise, a track-based ECC code may be used to correct data of a data track by analyzing data read from the entire data track. A shingled magnetic recording device that reads and writes data in bands (e.g., groupings of multiple data tracks) may utilize a band-based ECC code to correct data within a band by analyzing data of the band in view of a band-based ECC code.

A modulation encoder is another encoder type that analyzes the pattern of 1s and 0s within a binary data stream and alters the pattern to reduce the number of write errors that may occur as a result of too many consecutive transitions (e.g., from 0 to 1 or vice versa). Modulation codes add constraints to a binary data stream to suppress or eliminate certain patterns that are more error prone than others. For example, the pattern 1010101 may be more prone to error than 1111000. If the modulation encoder eliminates or suppresses high frequency patterns such as 1010101 or 0101010, fewer errors are included when the stored data is decoded. To impose constraints, the modulation encoder adds one or more redundant bits to the end of the data stream. A modulation decoder converts the altered binary data stream back to the original binary data stream when the data is read back from the storage medium 104 during a read operation.

A super parity is an error correction operation used to recover data during disk failures. Super parity is very powerful reliability feature designed to improve unrecoverable read error rate. Super parity can regenerate one sector (e.g., bit level regeneration) from a parity sector in a super block. Valid parity sectors can be used to rebuild an otherwise unrecoverable sector. This technique can fix a completely corrupted sector.

In a track-based super parity implementation, an entire track read is required during recovery of failed sectors. The size of a super block depends on a zone. Each zone has a different super block size. If a target track has many failed sectors (e.g., more than 2 failed sectors) during a whole track read, super parity cannot operate. An alternative implementation involving ISO-based super parity requires specified numbers of sectors (840 KB or 210 sectors per super block) for media cache. However, ISO-based super parity has shortcomings as well. ISO-based super parity decreases performance because ISO-based super parity has a cross-track issue (e.g., 1 super block throughout 2 tracks).

To allow for error correction and error prevention that is optimized in different areas of the disk 104, the microcontroller 126 applies a flexible super block scheme to track zones (e.g., Zone 1, Zone, 2, Zone 3, and Zone 4) of the disk 104. Specifically, the microcontroller 126 determines the size of a super block for a track zone in a storage medium based on at least one parameter of the track zone. Here a super block includes a super parity for recovery of a failed sector within the super block.

For example, the microcontroller 126 can determine the size of a superblock 132 (as shown in View A) to include one parity sector for N data sectors, including one defective sector to be regenerated. Determination of the superblock sizing is described in detail in FIG. 2.

Figure 2:
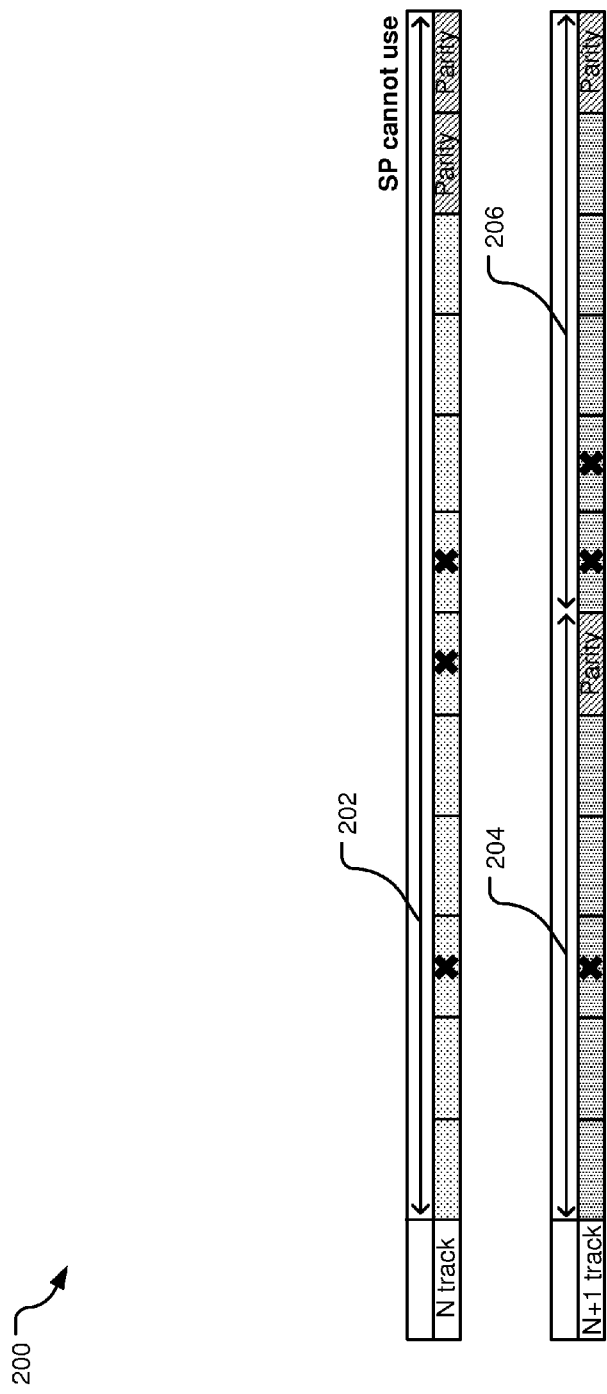
FIG. 2 illustrates schematic diagrams of example track zones with super blocks.

FIG. 2 illustrates a schematic diagram of super blocks in example track zones 200. The super blocks, on track N and track N+1, each have 12 sectors. There are two parity sectors in each track N and track N+1. As illustrated, for track N, both parity sectors are at the end, whereas for track N+1, one parity sector is at the end and the other is in the middle and the location of the parity sector is disclosed below. The 12 sectors in each track include 10 data sectors. There is one superblock 202 in the N track. Three of the data sectors on the N track are failed sectors, designated by "X." In track N, track-based super parity cannot be utilized because there are more than 2 failed sectors. Thus, no sectors can be recovered.

The disclosed technology is utilized for the N+1 track. The flexible super block sizing scheme divides the track sectors into two superblocks 204 and 206. Each of the super blocks 204 and 206 have one parity sector after five data sectors. By providing flexibility in super block sizing, super parity can be utilized because there is only one failed sector in super block 204 (i.e., not more than two failed sectors in one super block). Thus, the flexible super block sizing enables recovery of one failed sector in the N+1 track with the use of two super blocks as opposed to recovery of no failed sectors in the N track. By increasing the availability of parity sectors for a track and dividing the super block size into smaller super blocks within a track zone, there may be a loss in areal density capability. However, implementation of the flexible super block sizing technology results in better reliability performance.

Figure 3:
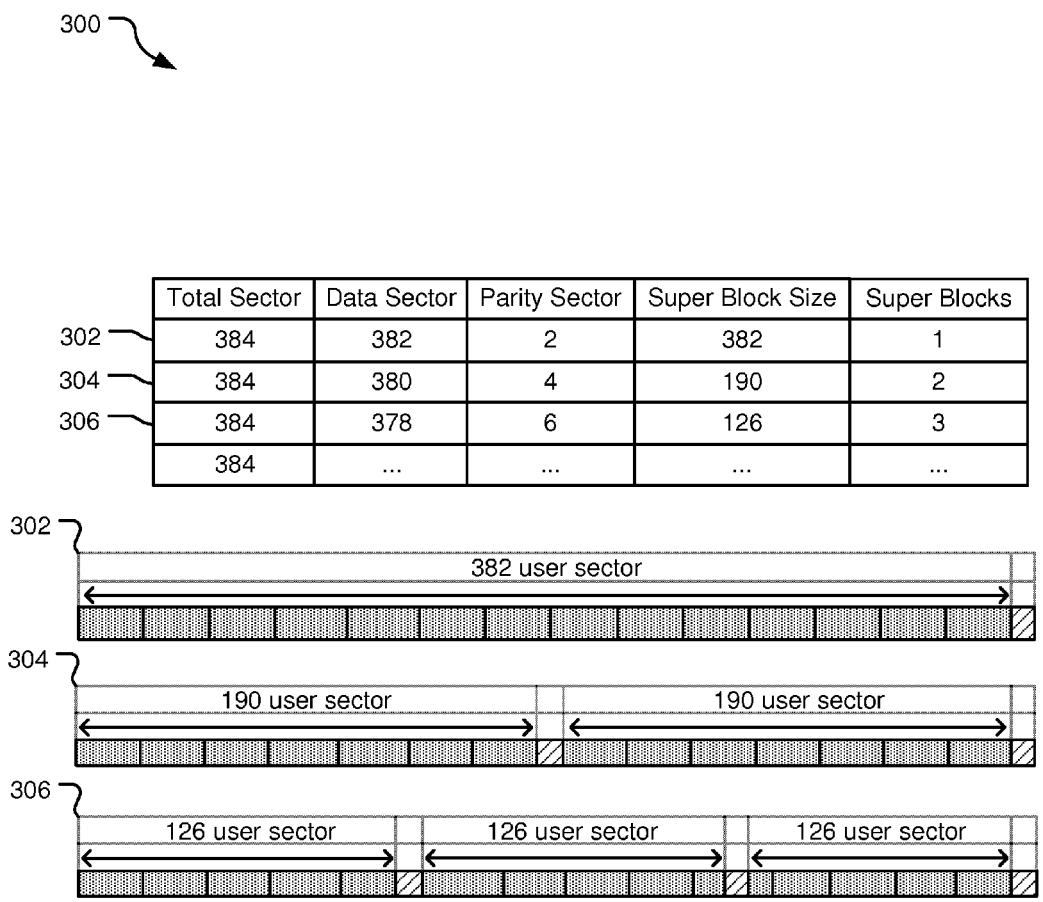
FIG. 3 illustrates a table showing different examples of the flexible super block sizing scheme.

FIG. 3 illustrates a table 300 showing different example super block sizing schemes 302-306 where the flexible super block sizing technology is utilized based on bit error rate and sectors per track. The super block sizing schemes in the table all have a total of 384 sectors to be divided into a number of super blocks.

In some implementations, different BER standards can be used to determine track quality and how many parity sectors are required in a flexible super block sizing scheme. Specifically, a BER ratio is the number of bit errors divided by the total number of transferred bits during a studied time interval. For example, a predetermined standard may require four parity sectors in a zone with a BER of less than −2.0. In a zone with a BER greater than or equal to −2.0 but less than or equal to −2.3, two parity sectors may be required. In a zone with a BER greater than −2.3, one parity sector may be required.

In the super block sizing scheme 302 in FIG. 3, it is determined that there are two defective sectors per the 384 sectors. This low bit error rate indicates bad track quality. Therefore, it can be determined that a given track requires more parity sectors. In one implementation, a standard may require, for example, a zone BER<2.0 may only require one parity sector. In this example, the low bit error rate requires two parity sectors for the 384 sectors. Thus, it can be determined that one super block size of 382 sectors is sufficient.

In the super block sizing scheme 304, there may be more than two failed sectors per the 384 sectors. Specifically, it may be determined that there are four defective sectors and 380 data sectors. In this implementation, it can be determined that four parity sectors are required. This can be accomplished by dividing the total sector into 2 super blocks, with two parity sectors in each of the two super blocks. This would result in each of the two super blocks being 190 sectors and two parity sectors, thus resulting in a total of four parity sectors per the 384 sectors.

In the super block sizing scheme 306, there may also be more than two failed sectors and a bit error rate higher than in example 304. Specifically, it may be determined that there may be six defective sectors and 378 data sectors in the total sector. In this implementation, it can be determined that the sector should be divided into three super blocks, with two parity sectors in each of the three super blocks. This would result in each of the three super blocks being 126 sectors and two parity sectors, thus resulting in a total of six parity sectors. The super block sizing schemes 302, 304, and 306 are shown schematically under the table in FIG. 3.

The described flexible super block sizing schemes can be implemented dynamically in process. When the bit error rate is high in a track zone (e.g., there are more than two defective sectors in a super block), the super block can be divided into smaller super blocks (e.g., divided into two or more super blocks) and the number of parity sectors can be increased based on the bit error rate and the sectors per track for a designated track zone.

Figure 4:
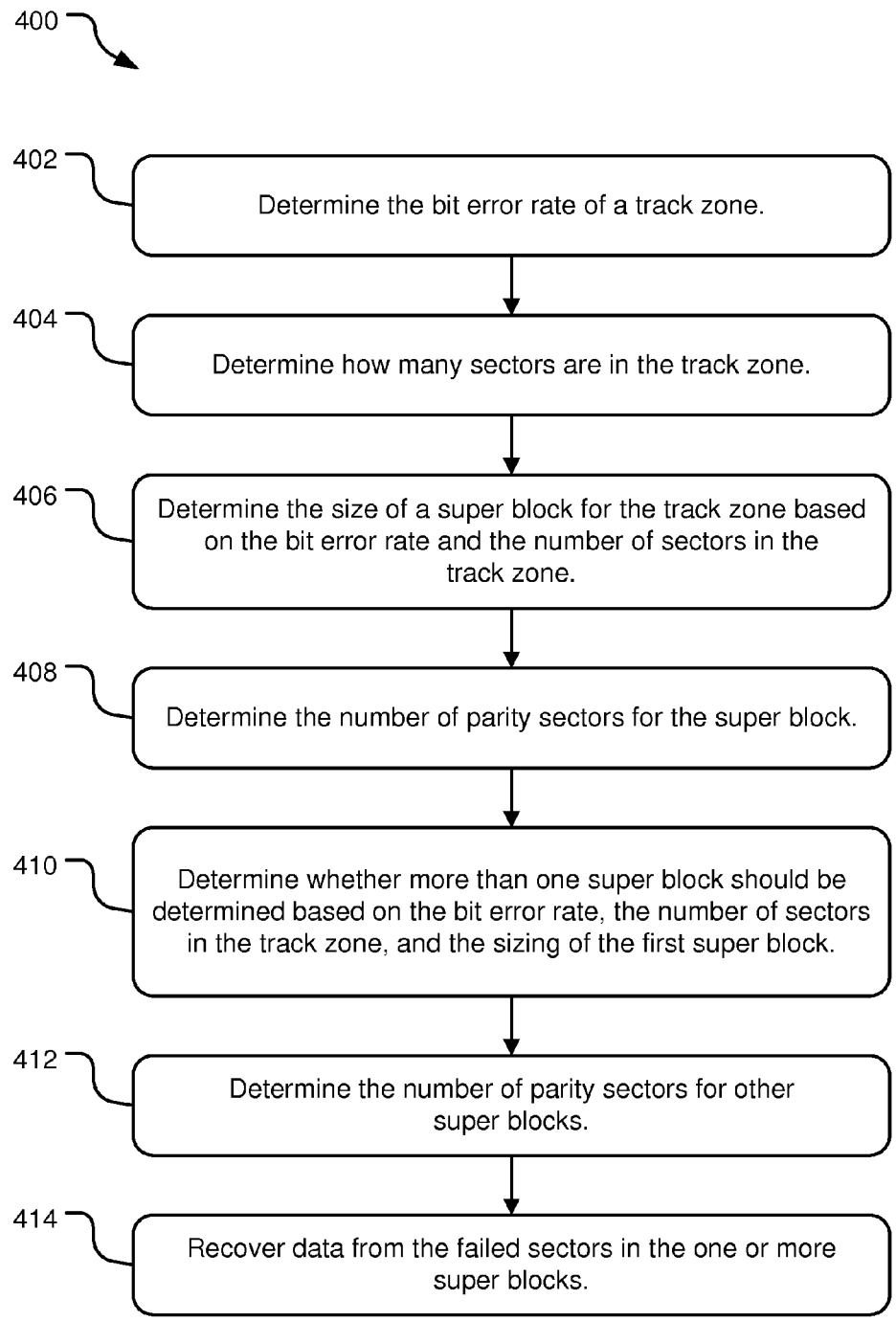
FIG. 4 illustrates a schematic diagram of an example storage medium utilizing a selection scheme for determining where to store data.

FIG. 4 illustrates example operations 400 for determining the size of a super block for a track zone in a storage medium. In an operation 402, the bit error rate of a track zone is determined. Operation 404 determines how many sectors are in the track zone.

Operation 406 determines the size of a super block for the track zone based on the bit error rate and the number of sectors in the track zone. If there are more than two failed sectors in a track and many data sectors, then more than one super block is required. Operation 408 determines the number of parity sectors for the super block.

Operation 410 determines whether more than one super block should be determined based on the bit error rate, the number of sectors in the track zone, and the sizing of the first super block. If more than one super block is determined in operation 410, then an operation 412 determines the number of parity sectors for other super blocks. Operations 402-412 can occur dynamically in-process sequentially or simultaneously. An operation 414 recovers data from the failed sectors in the one or more super blocks.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application— and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising: measuring at least one parameter from a track zone in a storage medium using a read head; determining a size of a super block for the track zone in the storage medium based on the at least one parameter of the track zone with a processor, wherein the super block includes a super parity for recovery of a failed sector within the super block; and determining a number of parity sectors for the track zone based on the at least one parameter of the track zone.

2. The method of claim 1, wherein a parameter is a bit error rate.

3. The method of claim 1, wherein a parameter is a type of data.

4. The method of claim 1, wherein a parameter is the number of sectors per track.

5. The method of claim 2, further comprising selecting a number of super blocks for the track zone in a storage medium based on the bit error rate.

6. The method of claim 1, further comprising recovering at least one failed sector in the track zone.

7. A storage device, comprising: a memory configured to store data; and a processor configured to measure at least one parameter from a track zone in a storage medium using a read head, to determine a size of a super block for the track zone in the storage medium based on the at least one parameter of the track zone, wherein the super block includes a super parity for recovery of a failed sector within the super block, and to determine a number of parity sectors for the track zone based on the at least one parameter of the track zone.

8. The storage device of claim 7, wherein the parameter is bit error rate.

9. The storage device of claim 7, wherein the parameter is type of data.

10. The storage device of claim 7, wherein the parameter is a number of sectors per track.

11. The storage device of claim 8, wherein the processor is further configured to select a number of super blocks for a track zone in a storage medium based on the bit error rate.

12. The storage device of claim 7, wherein the processor is further configured to recover at least one failed sector in the track zone.

13. The storage device of claim 7, wherein the storage device is a solid-state device.

14. The storage device of claim 7, wherein the storage device is a disc drive.

15. The storage device of claim 13, wherein the storage device is a disc drive using shingled media recording.

16. The storage device of claim 7, further comprising a variable bit aspect ratio controller.

17. A storage device, comprising: a controller configured to measure at least one parameter from a track zone in a storage medium using a read head, to determine a size of a super block for the track zone in the storage medium based on the at least one parameter of the track zone, wherein the super block includes a super parity for recovery of a failed sector within the super block, and configured to determine a number of parity sectors for the track zone based on the at least one parameter of the track zone.

18. The storage device of claim 17, wherein the controller is further configured to control a parity sector ratio of a track zone.

19. The storage device of claim 17, wherein the controller is further configured to divide track zone sectors in the storage medium into at least two super blocks.

20. The storage device of claim 17, wherein the controller is further configured to form a super block including a plurality of contiguous sectors within the track zone.

* * * * *